United States Patent Office 2,821,266
Patented Jan. 28, 1958

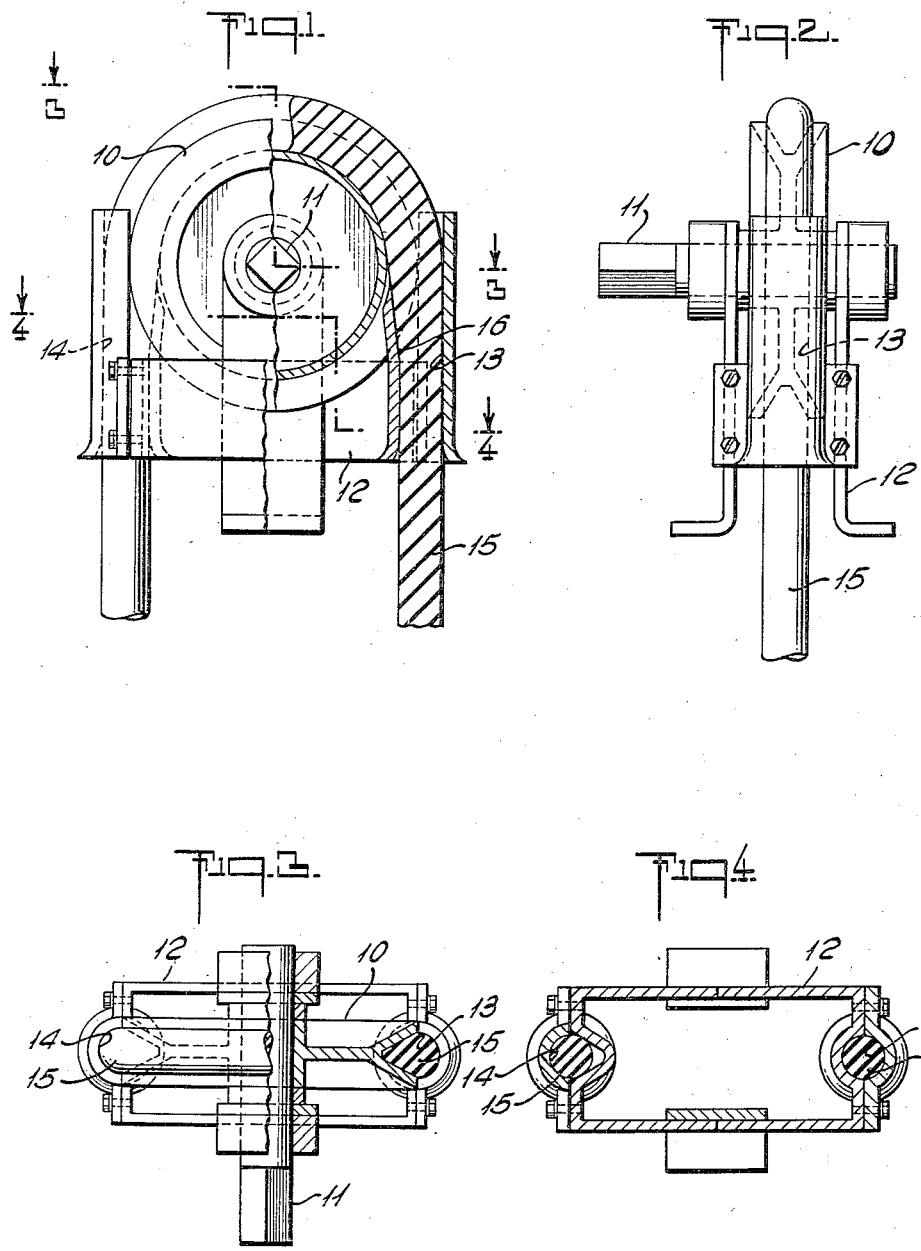

2,821,266

CORD OPERATED MECHANISM

James F. Hunter, New Rochelle, N. Y., assignor to Rosemary M. Hunter

Application April 6, 1955, Serial No. 499,731

2 Claims. (Cl. 188—65.3)

This invention relates to a cord operated mechanism for controlling adjustable devices, such as window shades, Venetian blinds and the like.

It is an object of this invention to provide a new and improved mechanism which will operate the device in either direction with ease but which will hold the device in any adjusted position as soon as the operating cord is released.

The mechanism is of the general type in which a flexible cord is carried over a grooved pulley with which the device is operatively connected. The cord engages the pulley with sufficient friction to drive the device and for this purpose the surface of the pulley may be roughened, or provided with teeth, in the usual manner to engage the cord. Associated with the cord is some element to lock the cord in position as soon as the adjustment is completed, which locking must be releasable when a new adjustment is desired.

With such operating mechanisms there is associated with the pulley supporting mechanism, a member providing an entering passageway on one side of the pulley and a leaving passageway on the other, through both of which the cord must pass as it reaches out from the pulley.

Such mechanisms have generally been operated by braided or twisted textile cords which are relatively inextensible and of fixed diameter. It has, therefore, been generally necessary to provide some forms of special mechanism to lock the cord.

This invention herein described discloses an improvement on such mechanisms which makes such extra devices unnecessary.

The invention accordingly consists in the device, one embodiment of which is hereinafter described and shown in the accompanying drawings, in which Fig. 1 is a side elevation of the device, partly in section; Fig. 2 is a front elevation of the same; Fig. 3 is a section on the line 3—3 of Fig. 1; Fig. 4 is a section on the line 4—4 of Fig. 1.

In accordance with this invention there is provided a pulley 10 which is connected to operate the device which this mechanism is to control. This device is here represented by a square stud 11. The pulley 10 is mounted in a frame 12 having guide passageways 13 and 14 through which the cord 15 must pass as it moves onto and leaves the pulley.

This invention depends upon a novel relation between the cord 15 and the passages through which it moves, in that the passages are designed to have a constricted portion to bear against the surfaces of the cord to restrain it from moving through the passage unless and until longitudinal strain is imposed on the cord, but the cord itself is so designed that when subjected to such strain it will shrink away from the constricted portion, permitting the cord to move freely to operate the pulley.

With the above description it will be clear that within the scope of this invention any form of cord may be used which will shrink away from the constricted portion under strain and again bear against the constricted portion when released. To this end a hollow tubular elastic member can be used if the constricted portion bears against its outer surface, or a tubular elastic member may have its bore filled with a sponge rubber, or the like, to assist it to regain its full diameter.

With such a cord the constricted portion may be a surface bearing only against the outer edge of the cord as it passes over the pulley. At present, however, I prefer to employ a solid rubber cord because the present highly developed technology of the rubber industry makes it possible to obtain uniform and reliable results. With such a solid elastic rubber cord as here shown the constricted portion members 13 and 14 comprise tubular members on the frame 12 which are of a diameter, as shown at 16, small enough to bind against the cord 15 when the cord is not under tension but large enough to permit the cord to pass through when the cord is pulled.

If the operated device is such as to impose a torque on the pulley it may be sufficient to employ such constricted passageway on the side away from which the pulley tends to move, but, in general, I prefer to provide one such passageway on each side.

It will be clear that if the cord is pulled down on either side the stretching of the cord will reduce its diameter within the constricted portion of the passageway to the point where the cord can pull through it. Thereupon the portion of the cord which rests above the pulley is also strained and stretched until ultimately the cord on the other side of the pulley first mentioned will slip through the passages permitting the cord to rotate the pulley so long as the tension is maintained. As soon, however, the cord is released it immediately assumes its normal proportions and engages the sides of the passageway, thereby locking the cord in place against movement in either direction.

With such construction, if the pulley, urged by the device to which it is connected starts to move in either direction, the movement of the pulley will tend to push the cord toward one of the constricted passages, thereby swelling the diameter of the cord and correspondingly increasing the friction to resist further movement while at the same time the constricted passage on the other side restrains the amount of the movement. With this construction, therefore, the difference in diameter between the cord and the constricted passage may be small.

What I claim:

1. An operating mechanism for a window shade roller or other similar device comprising a grooved pulley mounted in a bracket and connected to said roller to move the same, an elastic cord moving in said groove to drive said roller and a control mechanism for said cord comprising a tubular member attached to said bracket and surrounding said cord substantially tangent to said groove and extending longitudinally along said cord, said tubular member having a maximum cross-section substantially equal to the cross-section of the free cord and being at one point tapered down to a constricted cross-section substantially equal to the area of the cord when under tension, whereby, when the cord is pulled, it will stretch and thereby shrink in area sufficiently to pass through said constricted portion, but will bind at said constricted section when the cord is released.

2. A device according to claim 1 in which one such tubular member is provided for each stretch of the cord leading from said pulley.

References Cited in the file of this patent

UNITED STATES PATENTS

| 631,678 | Shepherd | Aug. 22, 1899 |
| 1,373,130 | Hahn | Mar. 29, 1921 |
| 1,377,768 | Fox | May 10, 1921 |
| 1,613,071 | Williams | Jan. 4, 1927 |